United States Patent [19]

Paeseler

[11] Patent Number: 4,947,438
[45] Date of Patent: Aug. 7, 1990

[54] PROCESS FOR THE RECOGNITION OF A CONTINUOUS FLOW OF SPOKEN WORDS

[75] Inventor: Annedore Paeseler, Hamburg, Fed. Rep. of Germany

[73] Assignee: U.S. Philips Corporation, New York, N.Y.

[21] Appl. No.: 217,535

[22] Filed: Jul. 11, 1988

[30] Foreign Application Priority Data

Jul. 11, 1987 [DE] Fed. Rep. of Germany ....... 3723078

[51] Int. Cl.$^5$ .............................................. G10L 5/00
[52] U.S. Cl. .................................... 381/43; 364/513.5
[58] Field of Search .................................. 381/41–43; 364/513, 513.5

[56] References Cited

U.S. PATENT DOCUMENTS 4,156,868  5/1979  Levinson ............................... 381/43
4,277,644  7/1981  Levinson et al. ...................... 381/43

FOREIGN PATENT DOCUMENTS 3215868  3/1982  Fed. Rep. of Germany .

OTHER PUBLICATIONS

Woods, "Transition Network Grammar for Natural Language Analysis", Communications of the ACM, vol. 13/No. 10/Oct., 1970, pp. 591–606.
Tennant, Natural Language Processing, Petrocelli book, New York/Princeton, 1981, pp. 75–101.
Niitsu et al., "A Method of Using Linguistic Information for Automatic Spoken Word Recognition", Systems.Computer.Controls, vol. 10, No. 1, 1979.
Tappert, "A Preliminary Investigation of Adaptive Control in the Interation Between Segmentation and Segment Classification "in Automatic.
"Recognition of Continuous Speech", IEEE Trans. on Systems, Man, and Cybernetics, vol. SMC-2, No. 1, Jan. 1972, pp. 66–72.
H. Ney, "Dynamic Programming Speech Recognition. . ." Proc. ICASSP, IEEE Conf., Dallas (4/87) pp. 69–72.
J. Earley, "An Efficient Context-Free Parsing Algorithm" comm. of the ACM, vol. 13, No. 2, pp. 94–102 (2/70).

Primary Examiner—Gary V. Harkcom
Assistant Examiner—David D. Knepper
Attorney, Agent, or Firm—Anne E. Barschall

[57]  ABSTRACT

Continuous speech recognition assigns predetermined words to syntactic categories and defines the syntactic categories which can follow and precede each predetermined word. The recognition process is achieved by comparing the input sequence of speech signals to reference values and summing those which are syntactically permissible until they form a valid word. Subsequent speech values to previouly calculated valid words are compared to reference values listed in syntactic categories which can follow the predetermined word. For each word, values are updated indicating the current word's sequence number, syntax category, cumulative comparison sum, and the current list of compared words. Values are also stored for each word which identify the previous word, the following word and their syntax categories. This process is repeated until all input values have been processed. The results are then checked to verify valid syntax and the words with the closest match are read out.

13 Claims, 3 Drawing Sheets

PROCESS FOR THE RECOGNITION OF A CONTINUOUS FLOW OF SPOKEN WORDS

The invention relates to a process for the recognition of a speech signal derived from a continuous flow of spoken word. The speech signal consists of a temporal sequence of speech values, each of which specifies a section of the speech signal. The speech values are compared with predetermined stored reference values. A group of the reference values in each case represents one word of a predetermined vocabulary. The comparison results are added up over various sequences of combinations of reference values and speech values per sequence. Only such sequences of words are taken into account whose order is permissible in accordance with a predetermined stored first list containing, for predetermined syntactic categories, at least one assignment per category to a combination of further syntactic categories and/or words.

A process of this kind is known from "Proc. ICASSP IEEE Conf. ASSP", Dallas, Apr. 1987, p. 69-72. In this known process, the first list is divided into two sublists, which on the one hand specify the assignment between words and predetermined syntactic categories and on the other hand specify the assignment of these categories to two other, subordinate categories where appropriate. Both lists are used for each new speech signal, in that retrospective observation is used each time to determine which category explains the preceding speech section best. At the end of the speech signal, that sequence of words can be traced back which resulted in the smallest total sum of all comparison results and which moreover correspond to the grammar provided by the two lists. However, as a result of the retropsective observation for each new speech signal, it may occur that a sequence is not directly traced back to the beginning and consequently the process eventually recognizes two or even more sub-sequences within the speech signal which are in each case grammatically correct within themselves but the sub-sequences do not match each other grammatically.

The object of the invention is therefore to state a process of the type mentioned at the beginning which functions more reliably and makes fewer demands of the form, that is to say the assignments of the first list, so that even more than two further syntactic categories and/or words can be assigned to a syntactic category.

This object is achieved according to the invention, in that a second list containing at least references to the references values of all those words which are compared with the respective next speech value as well as a sequence number per word, and in that in the course of the process, a third list is generated which contains, for each speech value which has been compared with the last reference value of at least one word, a group having in each case a plurality of entries, each entry containing in addition to a current sequence number
 (a) a reference to a syntactic category of the first list,
 (b) a first specification for a sequence of compared words and/or syntactic categores which are assigned to sequences of already compared speech values,
 (c) a second specification for a sequence of words and/or syntactic categories which can be assigned to subsequent speech values on the basis of the first list,
 (d) a further sequence number assigned to the respective entry,
 (e) a first evaluation value,
 (f) a second evaluation value and
 (g) a sequence of compared words, in that at least after.every comparison of a new speech value with the last reference value of at least one word, a new sequence number is determined and after each such comparison the group of entries of the third list associated with the sequence number stored in the second list at this word is searched through for such entries in which the sequence contained in the second specification begins with the compared word and, for each such entry present, a new entry is derived for the new group of the third list associated with the new sequence number, in that subsequently, for each new entry where the abbreviated sequence contained in the second specification begins with a syntactic category for which at least one assignment is present in the first list, first further entries are made in the new group and, furthermore, a second further entry for the new group is derived for each of the new and first further entries of the new group for which the second specification contains an empty sequence, in that deriving and making the first and second further entries alternately is repeated until, after at least one first further entry, no second further entry occurs, in that subsequently, for all entries of the new group where the second sequence begins with a word to be recognized, a reference to the reference data of this word is entered into the second list, in that subsequently the next speech value is compared with the reference values of all words contained in the second list, and in that this course of process steps is repeated until the last speech value of the speech signal to be recognized, after the processing of which the last group of the third list is checked for all entries containing a reference to the syntactic initial category and, as a second specification, an empty sequence and, as a sequence number, that of the first group, and, from these entries, the sequence of compared words is read out and output form that entry having the smallest first evaluation value.

The process according to the invention combines the advantages of a retrospectively directed hypothesization of grammatically correct continuations for the already processed part of the speech signal with a continuous verification of these hypotheses starting from the beginning. Moreover, the process according to the invention has the result that only those words, or the associated reference values, are compared with the input speech values that are permissible on the basis of the grammar defined in the first list. Sampling values of the speech signal which were obtained at 10 ms intervals and reduced to their spectral values can be used as speech values. Other measures for preparing the speech sampling signals may, also be used; similarly the speech values can be obtained from a plurality of sampling values and represent, for example, diphones or phonemes or even larger units, which makes no essential difference to the process according to the invention.

The process according to the invention has certain formal similarities with a process described in "Comm. of the ACM", Vol. 13, No. 2, Feb. 1970, p. 94-102. This process is, however, used to break down sentences in a written and hence unambiguous form into their grammatical components. This, however, presents problems in the automatic recognition of a continuous flow of speech, in that the manner of speaking and speed of speaking vary and the transitions between the words are fluid. The words within a sentence cannot therefore be determined reliably, but only with a certain degree of probability. During recognition, therefore, many different hypotheses for words or sequences of words must be considered. For an automatic recognition, then, that word sequence is to be determined which was spoken with the greatest probability.

It follows from the unreliability of the input data that for a larger vocabulary, for example of several hundred words, each new speech value input must be compared with a very large number of different reference values obtained from the combination of all words, the words occuring, due to the impossibility of exactly determining the word boundaries, with different lengths with respect to the reference words. When the restrictions which the grammar imposes on the combination possibilities of words are taken into account, the number of the words and hence of the reference values with which each new speech value must be compared can be restricted.

The speech values are expediently compared with the reference values according to the method of dynamic programming, which is known, for example, from German Offenlegungsschrift 3,215,868. It permits adaptation to a varying speed of speaking and the finding of the most probable word.

The process according to the invention is essentially defined by the use of the second list and the special structure of the third list. A particularly favourable order, particularly also with respect to the processing time, is obtained according to a development of the invention, in that before the comparison of the first speech value, the first group contains in first entries in each case a reference to a syntactic initial category, an empty sequence as a first specification, in each case another of the combinations assigned to the initial category as a second specification, and an intial value for the two evaluation values, as well as, in further entries, all the categories which can be derived from the combinations of the second specification with in each case corresponding combination, in that each new entry in the first specification contains a sequence extended to include the compared word, a sequence abbreviated to exclude the compared word in the second specification, the evaluation value incremented by the sum of the comparison results of the word as a first evaluation value, the sequence extended to include the compared word as a sequence of compared words, and furthermore the values of the entry present, in that the first further entries contain in each case a reference to the syntactic category of the new entry, from which this first further entry is derived, an empty sequence in the first specification, in each case another combination assigned to the syntactic category as a sequence in the second specification, the new sequence number as a further sequence number, the evaluation value of the new entry for both evaluation values, and an empty sequence as a sequence of compared words, in that for each second further entry, from that group specified in the further sequence number of the relevant new or further first entry, that earlier entry is read out where the sequence associated with the second specification begins with the syntactic category to which this new or first further entry of the new group contains a reference, wherein the second entry contains the reference to the syntactic category of the earlier entry, a sequence extended to include the syntactic category of the current new or first further entry in the first specification, a sequence abbreviated to exclude the same syntactic category in the second specification, the sequence number of the earlier entry as a further sequence number, the sum of the first evaluation value of the earlier entry and the difference between the two evaluation values of the current entry as a first evaluation value, the corresponding evaluation value of the earlier entry and the sequence of compared words of the earlier entry extended to include the sequence of compared words of the entry of the current group as a second evaluation value, and in that each reference to the reference data, together with the associated first evaluation value and the sequence number of the relevant entry, is entered into the second list. In this way, the evaluations are taken into account particularly well when completing recognized word sequences and when hypothesizing about correct continuations.

In the process according to the invention, it is possible that in the course of recognition of sentence, two or even more hypotheses converge at a common point, that is to say two or more hypotheses result in the same grammatical continuation, with the evaluation of the converging hypotheses being different in general. In this case, it is expedient, according to a further development of the invention, that each first and second further entry is only made provided that no entry is present in the new group, which entry contains the same reference, the same first and second specification and the same further sequence number and in which the first evaluation value is smaller than the first evaluation value of the intended further entry and, in the case of such an entry being already present but with a greater evaluation value, the latter is deleted. Therefore, as a result of this, converging hypotheses are not separately traced further, but only the best one is taken into consideration further, since the other hypothese cannot obtain a better overall evaluation at the end of the sentence to be recognized due to the same continuation. The conditions checked here ensure that really only those hypotheses are combined which result in exactly the same continuation. This represent, therefore, a recombination of hypotheses on the grammatical level.

It is of course possible that, in a group of entries in the third list where there is a plurality of entries, the second sequence begins with the same word or the same method. In this case it is expedient according to a further development of the invention that a reference to reference data is only entered into the second list provided that no reference to the reference data of the same word and the same sequence number with a smaller evaluation value is already present in said list, and, in the case of such an entry beng already present but with a greater evaluation value, the latter is deleted. A word or a word class need only be transferred from a group into the second list once, since after the complete comparison of this word, all entries of the relevant group are searched through to find whether the second sequence begins with this word therein. When the word from the entry with the smallest evaluation value is transferred into the second list, this entry specifies the best possible evaluation of a word sequence which has led to the word transferred into the second list. On the other hand, the same word is transferred again and again into the second list from various groups.

In the case of a vocabularly range necessary for realistic application, however, the number of words to be simultaneously compared, reduced by taking account of the grammar, is still too large, so that to speed up the process, the search must be concentrated on the most promising hypotheses. This takes place according to a development of the invention in that each new and each first and second further entry is only made if its first evaluation value is smaller than a threshold value which is equal to the smallest evaluation value, extended by a constant, of all entries currently contained in the second list. Only such hypotheses are traced further, therefore, whose evaluation value deviates from the best evaluation value for a hypothesis only by the constant. The time required for the recognition of a sentence can be vastly reduced by this "cutting off" for less promising hypotheses.

This "cutting off" for unfavourable hypotheses, i.e. on the grammatical level, can also be correspondingly applied directly to the comparison of the words, to be precise preferably additionally. For thiis, according to a further development of the invention, every entry in the second list whose first evaluation value is greater than the threshold value is delected. In this manner, the extent of the second list is normally continually reduced during the comparison with the successive incoming speech values, while on the other hand it is continually extended when tracing the more favourable hypotheses from the third list. In this manner, the extent of the second list remains restricted, so that the actual comparison procedure is executed quickly. A uniform evaluation for both cases is achieved by the use of the first evaluation value for the threshold value.

This threshold value can, however, only be determined when a new speech value has been compared with the reference values of all the words contained in the second list, so that a further pass is necessary for deleting entries in the second list in each case. This further pass can be dispensed with, according to a further development of the invention, in that the evaluation value of the preceding speech value is used for the determination of the threshold value as a smallest first evaluation value of the entries of the second list. However, since as a result of this a slightly smaller minimum first evaluation value results, the constant is increased slightly so that the same threshold value is essentially obtained here again as would result from the use of the last entries in the second list. The value of the constants is in any case dependent on the demands made of the speech system. If this constant is selected to be large, many hypotheses will be traced, so that the time required for the entire recognition of a sentence increases, whereas with a smaller value for the constant, the correct hypotheses may be lost in some very unfavourably spoken sentences, to that correct recognition can no longer occur.

The words or entries in the second list are deleted in particular when the actual word corresponding to the current speech values has little resemblance to a word contained in the second list. Since the last reference value of the last or a very similar word is, however, compared not only once but with several successive speech values, since for example the word ends can be spoken with a drawl, such a word would remain a relatively long time in the second list. Since a drawling of this kind is assumed to be only limited, however, it is favourable to delete such entries corresponding to completely recognized words as soon as possible. This can occur according to a further development of the invention in that a word is delected from the second list if the number of sequence numbers lying between the new sequence number and the sequence number stored at the word is greater than a limit value contained in the reference values for this word. In this manner, drawled ends of words can still be captured while, on the other hand, such words do not greatly impede to slow down the recognition procedure.

An entry into the second list is made from corresponding entries of the third list, namely where the second sequence begins with a word to be recognized. Particularly with an extensive vocabulary, a hypothesis can be continued with a multitude of various words all belonging to the same grammatical word class, for example, all verbs of the vocabulary. An entry is then also present in the third list for each individual word, so that the latter becomes very extensive. In order, in particular, to reduce the extent of the third list, it is expedient according to a further development of the invention that the first list contains assignments of predetermined syntactic categories to other syntactic categories and/or word classes instead of words and in that, for all entries of the new group where the second sequence begins with a word class, a reference to this word class instead of to reference data of a word is entered into the second list. All words to be entered into the second list or which must be compared with the next incoming speech values are then determined unambiguously and directly from the word class. The third list then contains only a single entry in each case for all words of this kind.

The extent of the second list can also be reduced in a similar manner when, namely, a reference is not entered separately to each of the words to be recognized, but likewise only to the word class, into the second list. In this case it is expedient that, with each reference in the second list, an auxiliary list is called up containing for each word class the references to the reference data of the words belonging to this class, and these references call up the corresponding reference values from the further list. The auxiliary list may have a very simple structure, since it only contains the assignment of a word class to the individual associated words.

For the realization of the recognition of speech signal, devices are known having a transducer for converting a spoken sentence into an electrical speech signal and for forming speech values, having a first memory containing specifications on syntactic categories of natural language and their assignment to further syntactic categories and/or specifications for words or word classes, having a further memory for reference values formed analogously to the speech values from sentences spoken earlier, and having a comparison device connected to an output of the transducer and to a data output of the further memory to supply comparison results from the comparison of speech values with reference values. The development of such an arrangement for carrying out the process according to the invention is characterized in that a second memory which stores the entries for the second list and a third memory which stores the entries for the third list are provided, the contents of the second memory specifying at least a part of the addresses of the further memory, and in that a controller is present which is set up such that it address the first, the second and the third memory and records data in the second and the third memory and reads out of these as well as out of the first memory and, on receiving a word end signal for at least one word, forms the new, the first and the second further entries for the third memory and subsequently the entries for the second memory and records in these and, after processing of the last speech signal, outputs the complete word string contained in the third memory with the smallest evaluation value to an output device. In this arrangement, it is particularly expedient that the controller is a processor, in particular a programmed microprocessor. Inasmuch as the third list contains references to word classes instead of the words themselves, it is moreover expedient that the output of the second memory is coupled to the address input of an auxiliary memory, the output of which is coupled to a partial address input of the further memory.

Exemplary embodiments of the invention will be explained below in more detail with reference to the drawing, in which.

Figure 1:
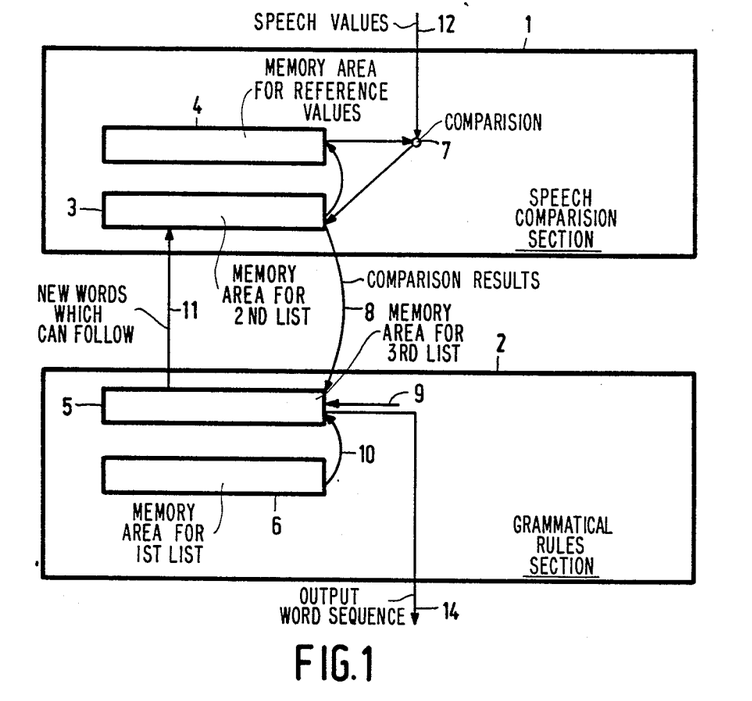
FIG. 1 shows a schematic overview of the two-step nature of the process according to the invention.

FIG. 1 shows a schematic diagram which clearly illustrates the two sections into which the process can be divided. The actual comparison of speech values, supplied via input 12, with reference values takes place in section 1. The comparison results for completely compared words are supplied via path 8 to section 2, where, on the one hard, these words are stored and, on the other hand, the comparison results of these in each case completely recognized words, together with the grammatical rules for this, are used to determined new words which can follow next on the basis of these grammatical rules, and these new words are supplied to section 1 via path 11, in order to determine or to complete the reference values with which the following speech values, supplied via input 12, are to be compared. In this manner, the process alternates continually between section 1 and 2, until the last speech value is compared. Subsequently, via output 14, the word sequence is output which has shown the best matching with the sequence of speech values and which moreover corresponds to the stored grammatical rules.

The speech values supplied via input 12 may, for example, be short-time spectra obtained from the speech signal at 10 ms intervals; they may however also be already further processed values, for example phonemes or diphones. The determining of the speech values, supplied via input 12, from the speech signal is not illustrated in more detail here, since this is performed in a usual manner and the details of this are not important for the invention.

The reference values with which the speech values are compared are obtained in the same manner as the supplied speech values from speech signals of previously spoken sentences, and they are stored in a memory or memory area 4. The actual comparison is symbolized by the circle 7, and it may be carried out, for example, in a manner known from German Offenlegungsschrift 3,215,868. In particular, varying speeds of speaking can thus be taken into account.

The reference values are selected in accordance with a list, which is designated hereinafter as the second list and which is stored in a memory or memory area 3. This second list contains references to words in coded form which, as described above, have been determined in section 2 of the process and specify which word can represent the speech values coming in via input 12 on the basis of the grammatical rules. Each word is incidentally assigned to a temporal sequence of reference values, the temporal successive processing of which is not illustrated in more detail or is contained in the comparison operation 7. The comparison result from the comparison operation 7 is again stored in the second list 3. As will be explained in more detail later, several words are "active" in each case, that is to say the associated reference values are compared with each incoming speech value, and the list in memory 3 contains yet further specifications in addition to the coded word. Since the various words are however mostly of differing lengths, that is to say contain a different number fo reference values, and since on the other hand various words are begun frequently at different times, the comparison of a word with the incoming speech values can be fully completed, that is to say the last reference value of the word has been compared with a speech value while the beginning or the middle area of other words is compared.

When a word has been complelely compared, therefore, it is supplied together with the further, still to be explained, specifications via path 8, which represents a step in the process, to section 2 and is used there to update a list, hereinafter designated as the third list, and is stored in a memory or memory area 5. This third list is modified yet again by further process steps, indicated by the arrows 9 and 10, arrow 10 specifying the consideration of a list which is hereinafter designated as the first list and is stored in a memory or memory area 6. This list has a structure such that the grammatical rules of speech are taken into account when determining the grammatically permissible next words to be compared. Arrow 9 indicates changes in the third list in the form of additional entries which are only formed on the basis of entries present in the third list.

The order of the overall process will be explained in more detail below with reference to the flow chart schematically represented in FIG. 2. The structure of the third list in memory 5 is of importance for this, which is indicated more fully in FIG. 3. This third list is subdivided into a number of groups of entries, in which entries 31 and 32 are specified for the first group with the sequence number 0, entries 41 and 42 are specified for the next group with the sequence number k and entries 51 to 54 are specified for the last group with the sequence number n. Each entry is subdivided into a number of sections a to g, which form quasi-columns over the row-by-row entries in the list. The sequence numbers are specified only once for each group for the sake of clarity. It is, however, actually contained in each entry in a corresponding section. This third list in FIG. 3 is first generated or filled up during the execution of the processing with the successive incoming speech values, that is to say initially the list is not present at all or is empty. The number of entries per group of the third list is not defined here, but is obtained from the course of the process on the basis of the incoming speech values.

Figure 2:
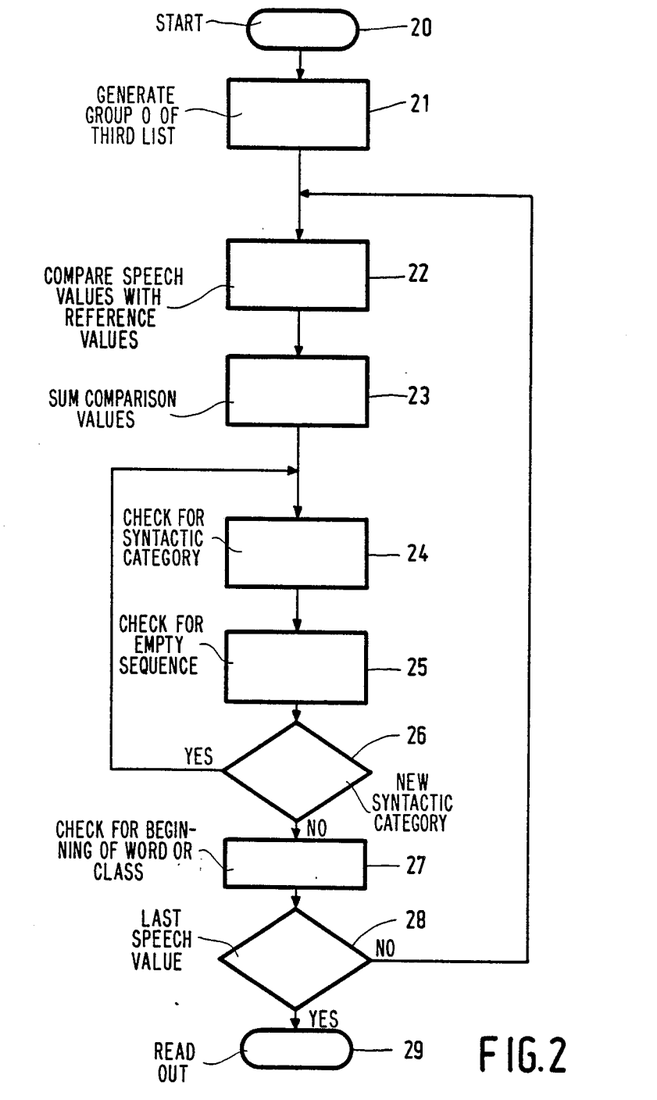
FIG. 2 shows a flow chart to clarify the process.
Figures 3, 5:
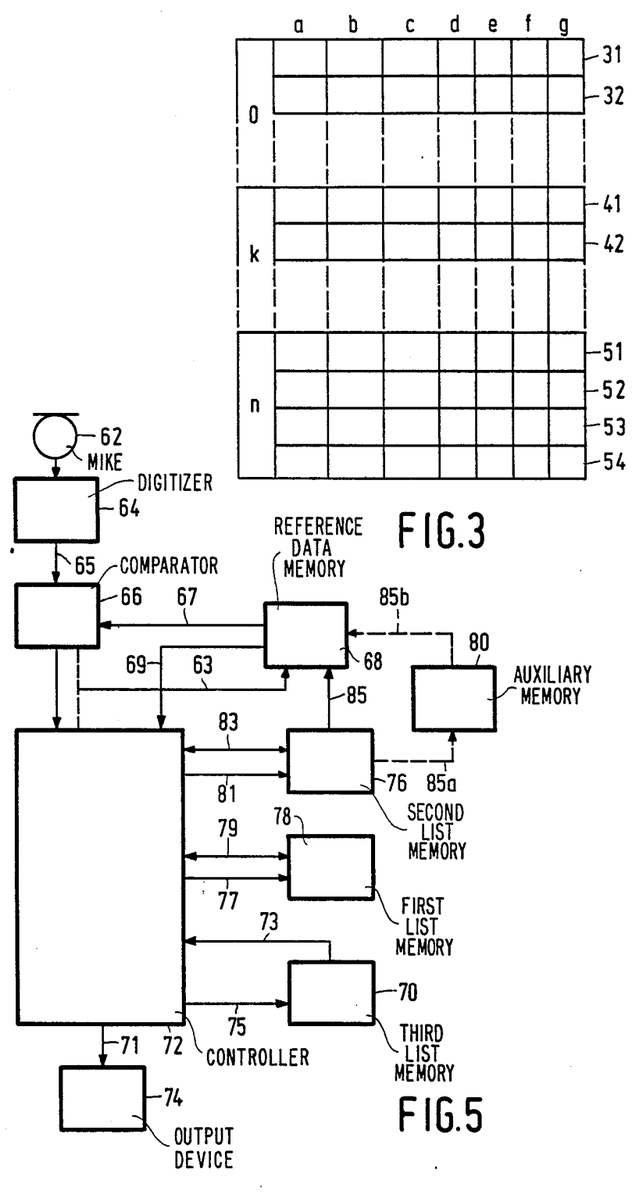
FIG. 3 shows the basic structure of the entries in the third list.
FIG. 5 shows a schematic block circuit diagram for carrying out the process according to the invention.

In FIG. 2, symbol 20 represents the general start symbol. In block 21, the group 0 of the entries in the third list in FIG. 3 is generated before the first speech value arrives, to be precise on the basis of the first list containing the assignment of syntactic categories of various orders to each other and to words. A syntactic category is in particular a part of a sentence, for example the object, which may consist of a subordinate clause, of a noun with or without adjectives, of a pronoun or of an empty part of a sentence, that is to say may not be present at all. One line in the first list is available for the syntactic category "object" for each of these possibilities. The individual possibilities here in turn represent at least partly syntactic categories for which there are likewise various possibilities in the grammar, that is to say several lines in the first list, etc.

The first list with the syntactic categories and their assignment to each other and to words is defined for the process and determines which sentences can be recognized with which grammatical structures. This list is therefore already available at the beginning of the process and is not subsequently changed.

In every grammar, even in a very limited grammar only for simple sentences, a syntactic category is, however, always present, namely an initial category which comprises each recognizable sentence and for which the first list contains one or in general a plurality of assignments to other syntactic categories which represent virtually the most basic division of a sentence. These most basic syntactic categories in turn contain further assignments in the first list, etc., unit finally each assignment chain results in words to be recognized. An advantageous intermediate solution consists incidentally in that the strings of assignments are not allowed to end in the words to be recognized themselves, but in word classes, such as nouns, verbs, etc., for example. This reduces the extent of the first list, and the third list, and possibly also the second list, quite substantially. This will become even clearer during further explanation of the process. Only at transition 11 from the second process step to the first, that is to say when the next words to be recognized are transferred, is the word class in question broken down into the individual words. In doing so, each word of the word class in question can be entered into the second list, or only the word class is also entered into the second list, and from this word class the reference values of the associated individual words are called up, for example via an auxiliary memory.

In the first processing block 21 of the flow chart in FIG. 2, the entries for the group 0 are thus generated in the third list of FIG. 3. Any number may be selected as the sequence number of the individual groups; however, it is expedient to select this to begin in natural numeric order and continue upwards, so that here the sequence number 0 is selected.

The individual sections of each entry of the third list thus have the following meaning.

(a) This is a reference to a syntactic category of the first list, that is to say expediently the address of those lines of the first list in which a syntactic category occurs for the first time. Since all assignments to a syntactic category are frequently required one after the other, these are arranged successively in the first list, so that counting can be continued from the first line for the assignments of in each case one syntactic category.

(b) This section contains a specification for a sequence of already compared words and/or syntactic categories, wherein this sequence has moreover already been checked to see that it matches the grammatical rules according to the first list. This is automatically ensured in that the sequence specified in sectin b represent a part of the assignment to the syntactic category specified in section a.

(c) This section contains a specification for a sequence of words and/or syntactic categories which represents the rest of the assignment of the syntactic category in section a and hence specifies a sequence of possible words or categories still to be expected in the following speech signal.

(d) This section contains a further sequence number of a group, to be precise either of the current group or an earlier group, depending on how the entry in question of the third list is formed. This will become clearer from the further description of the process.

(e) This section contains accumulative evaluation value which specifies the total sum of all comparison sums between all previously arrived speech values and the total sequence of reference values belonging to the hypothesis of which the syntactic category specified in section a represents at least a part.

(f) This section contains an evaluation value which had been attained as the syntactic category was begun according to section a.

(g) This section contains a sequence of compared words corresponding to the sequence specified in section b. Since, in section b, however, also already only syntactic categories can be specified in part or completely, which therefore combine in each case a plurality of words or, to be more precise, a plurality of word types, the individual recognized words must be recorded separately in the correct sequence, which takes place on this section.

First of all, the assignments to the initial category in the first list are now entered in the entries 31, 32 etc. in the group 0. Here, therefore, section a contains the reference to this initial category, for example to the first line in the first list, section b contains an empty sequence, since no comparisons have been made yet, while section c contains the further syntactic categories assigned to the initial category. Section d contains the sequence number of the first group, i.e. 0. Sections e and f contain an initial value, expediently the value 0. Likewise, section g does not yet contain anything, or just an empty sequence.

When in this manner all assignments to the initial category to entries have been processed, the first syntactic category of the section c is checked for each entry, to see whether an assignment to further categories or words is present for this, and for each such assignment a further entry is made in group 0, where section a of the new entry contains the first category of section c of the old entry, section c contains the assigned sequence of syntactic categories or words or a mixture of these, while sections b and d to g contain the same values as for the first entry. Section c are likewise checked again in these extended entries to see whether it contains a sequence beginning with a syntactic category, etc., until finally only entries have been extended in which each sequence specified in section c begins with a word to be recognized, namely with one of the first possible words of all recognizable sentences. Since the words at the beginning of a sentence, however, all belong to one or a few different classes of word due to the grammar, just as the possible words at the further positions within the sentence, it is expedient only to specify the word classes in section b and c in the entries in the third list. Third reduces the extent of the third list quite substantially, as is readily apparent.

No further assignment is now present for this first word or word class, but this first word or word class in section c of the entries in question must be transferred into the second list, so that the first speech value can be compared with the reference values of the permissible first words of a sentence. Furthermore, the first evaluation value contained in section e, that is to say usually 0, as well as the associated sequence number of the group, that is to say in this case likewise the value 0, is transferred into this second list. This is the initial status of the second list, which however, is frequently changed during the course of the process.

After the second list has been created in this manner with the words to be compared and the third list has been created with the first group, the first speech value can be compared with reference values in block 22 in FIG. 2. The comparison result represents a measure of the matching or a distance value between the first speech value and the corresponding reference values, and this applies analogously also for the following speech values. Each new distance value determined is added in a manner known per se to the minimum comparison sum determined up until then. This occurs during the progressive course of the speech signal with a plurality of temporally sequential reference values of the same word in accordance with the principle of dynamic programming, as is described, for example, in the already mentioned German Offenlegungsschrift 3,215,868, in order in particular to be able to compensate for varying speeds of speaking, until finally the last reference value of a word has been compared, or more precisely, has been compared for the first time, since the next following speech value(s) is (are) likewise still compared with the last reference value. Incidentally, the sequence number is increased with each new speech value, but a new group with entries for a sequence number is only made when the associated speech value has been compared as mentioned with the last reference value of a word. Instead of this, an updating of the sequence number can only take place at each word end of this kind.

This takes place in block 23 in FIG. 2. In doing so, a new entry is made into the third list from such a completely compared word as well as from the sequence number stored at this word or the associated word class in the second list and from the evaluation value stored there, which is increased by the comparison sum of this word. For this, in the group, the sequence number of which is stored at the completely compared word or the associated word class in the second list, in the third list at least section c of each entry is read out and it is checked whether the sequence contained therein begins with the word or the associated word class which has just been completely compared. At least one such entry must be present in any case, since it is only from such an entry of the third list that the recognized word or the associated word class in the second list can have come. For each such entry, for the group with the current sequence number in the third list, a new entry is generated which contains in section a the same reference to the syntactic category as the entry read out, in section b the sequence extended to include the completely compared word or the associated word class, in section c the correspondingly abbreviated sequence, in section d the same sequence number as in section d of the entry read out and in section e an evaluation value equal to the sum of the first evaluation value from the entry read out and the comparison sum attained for the word in question, while the second evaluation value of the entry read out is transferred, and in section g the sequence contained therein is extended to include the completely compared word, specifically really only the compared word, not the word classes. At the first completely compared word after the beginning, some of these values of the new entry seem rather trivial; however, in the further course of the process, the derivation of the individual sections of each new entry has great significance.

Before a new entry of this kind is entered into the current group of the third list, it is however still checked whether the evaluation value determined for the section e is smaller than a threshold value. This threshold value is determined from the evaluation values of all entries currently contained in the second list, in that the smallest of these evaluation values is searched for and is increased by a fixed constant. As already mentioned earlier, for each word or for each word class in the second list, the smallest evaluation value in each case, that is to say the best possible evaluation for a sequence of words, is recorded which led to the word or the word class in question. In the continuation of the hypotheses which are currently active via a corresponding entry in the third list, although it is possible that a hypothesis which does not currently have the most favourable evaluation value turns out to be in the further continuation more favourable than other hypotheses, that is to say exhibits a lesser increase of the evaluation value, it is however assumed that this improvement is only limited. This limited improvement is taken into account by the constant when the threshold value is determined. If, therefore, a new entry has a first evaluation value, greater than this threshold value, it is assumed that this hypothesis can no longer lead to a word sequence with smallest overall evaluation even in the case of a favourable continuation. The value of the constant thus represents a compromise, since if this is selected to be too small, it may result in the most favourable word sequence being lost, because it is temporarily less favourable than others, while too large a constant leads to too many hypotheses being further traced, which increases the processing required for the recognition of the speech signal considerably. Moreover, in the latter case, the possibility of an incorrect recognition is increased. Overall, however, with a relatively high value of the constant, that is to say with a high threshold, a substantial reduction of the processing time is still achieved in contrast to the case when no threshold is taken into consideration.

Incidentally, the same threshold is also used in the comparison of the speech values with the reference values specified by the entries of the second list. In the majority of hypotheses, continuation can namely be made on the basis of the grammar with various words, which becomes particularly clear if word classes instead of words are entered in the second list. In most cases these possible words are substantially different, so that in the case of these words it is already evident after a comparison of only part of the reference data of this word that it does not match the word contained in the speech signal sufficiently. This is evident from the fact that for such words the sum from the associated evaluation value from the second list and the comparison results rises sharply. If such words are no longer taken into consideration as soon as this sum exceeds the threshold value, in that this word is then deleted in the second memory or, if word classes are stored in the second memory, the assignment of these badly matching words to the word class in question is no longer taken into consideration, then considerable processing time can likewise be saved.

A further reason for deleting a word in the second list or no longer taking the assignment of a word to a word class in the second memory into consideration arises from the fact that, as mentioned earlier, several successive speech values are compared with the last reference value of a word in order to take a drawled pronunciation at the end of a word into account. Although, if the word in question in the speech signal is not spoken with a drawl, the comparison sum when comparing the last reference value with further successive speech signals becomes rapidly larger, so that the sum of evaluation value and comparison sum exceeds the threshold value, however, the number of successive speech values compared with the last reference value can be reduced in that only an, if appropriate, word-dependent given number of successive comparisons are made and subsequently the word in question is deleted from the second memory. This can save further unnecessary processing time.

If the last reference value of several words has been compared simultaneously, that is to say with a certain speech value, this process step is performed separately for each word. When in this manner the corresponding new entries have been made in the third list for the completely compared word or all completely compared words, these individual new entries are checked to see whether section c begins with a syntactic category. This takes place in block 24 in the flow chart according to FIG. 2. If an entry is then found where section c fulfils this condition, to the group with the current sequence number are added first further entries which contain in section a the reference to the syntactic category of section c of the entry tested, in section b an empty sequence, in section c the sequence of further syntactic categories and/or words or word classes assigned to this category, in section d the current sequence number, in sections e and f the first evaluation value from section e of the entry tested and in section g an empty sequence. Before this entry, or each first entry, is actually made, however, it is checked whether an entry in the current group is not already present whose specifications in sections a to d completely match the entry to be made. If such an entry is indeed already present in the current group, it is checked whether the first evaluation value is greater than that of the entry to be made. If this is the case, the present entry is replaced by the entry to be made, and in the other case, the newly derived first further entry is not made. The comparison of the specifications in sections a to d ensures that in this manner two hypotheses are recombined which, although they have usually started from different points and have taken different paths, however now should find exactly the same continuation. In this case, only the hypothesis with the most favourable evaluation value up to now is therefore further traced, since another hypothesis cannot achieve a better evaluation value even at a later stage. A comparison of the first evaluation value of each of these first further entries with the threshold value is no longer necessary, since these first further entries cannot have a higher evaluation value than the entries already present.

When this has been performed for all new entries in question of the group with the current sequence number, it is checked, in accordance with block 25 in the flow chart according to FIG. 2, whether in this group an entry is present in which section c contains an empty sequence, where therefore the sequence assigned to that category specified in section a has been completely compared.

In the case of such an entry, in the group whose sequence number is specified in this entry of the current group in section d, that earlier entry is searched for in which section c begins with that syntactic category specified in section a of the entry in question of the current group. A second further entry for the current group is then derived from the earlier entry, which entry contains in section a the syntactic category in section a of the earlier entry, in section b the sequence extended to include the syntactic category of the entry in question of the current group, in section c the correspondingly abbreviated sequence, in section d the sequence number of the earlier entry, in section e the sum of the first evaluation value of the earlier entry and the difference of the two evaluation values of the entry in question of the current group, in section f the corresponding evaluation value of the earlier entry and in section g the string of the word sequences from both entries. In this manner, the hypotheses for older, higher-ranking syntactic categories are continually verified. Before this second further entry is actually made into the third list, it can be checked analogously as described above whether the first evaluation value obtained by means of forming a sum has not become greater than the threshold value.

All entries of the current group are processed in this manner. In this process, only entries can arise in which section c contains an empty sequence, so that the preceding process step is carried out again for all entries of the current group, in which new categories are thus entered, and the verification of the older hypotheses is subsequently continued again etc., until no new syntactic category has been entered any more. This is indicated by the decision lozenge 26 in the flow chart in FIG. 2, which therefore performs the loop through blocks 24 and 25 until no new entry is made, when the process then moves to block 27. In block 27, all entries of the current group of the third list are run through again, but it is now checked whether an entry in section c is present whose associated sequence begins with a word or a word class. If such an entry is found, this word or word class is transferred into the second list together with the first evaluation value of this entry and the sequence number of the current group.

Before transferring into the second list, however, it is checked whether an entry with the same word or the same word class and the same sequence number is not already present therein. If such an entry is found, it is checked whether the entry present has a greater evaluation value than the entry to be made. If this is the case, the entry present is replaced by the entry to be made, otherwise no new entry is made into the second list. In this manner, the second list always only contains the entry of a particular word with the smallest evaluation value of in each case a sequence number, which is of significance for the abovementioned determining of the threshold value.

It is checked in lozenge 28 whether the last speech value has been input. If this is not the case, the process returns to block 22 and the next speech value is processed in the manner described. If, however, the last speech value has been reached, the process moves to block 29, in which the last group of the third list is searched for entries containing in section a the initial category, in section c an empty sequence and in section d the sequence number of the first group as a sign that a grammatically complete sentence has been compared, and if several such entries are present, that entry is used which has the smallest first evaluation value in section e, and from this entry the word sequence in section g is read out which represents the sentence recognized with the greatest probability. This completes the process.

Figure 4:
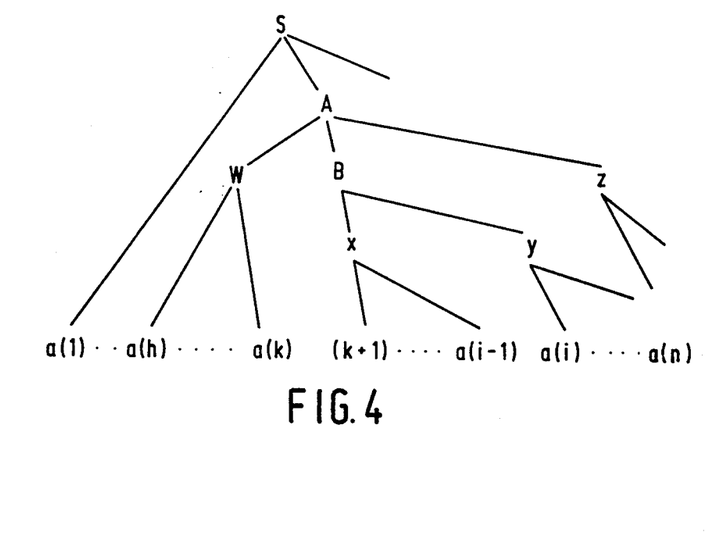
FIG. 4 shows the determining of the sequence of words or syntactic categories from an input sequence of speech values.

FIG. 4 illustrates how new hypotheses are developed and old hypotheses are concluded with the assignments during the process. A sequence of syntactic categories, of which one is denoted by A, is assigned to the initial category, which is denoted here by S. This syntactic category A breaks down in turn into a sequence of a word w, a further syntactic category B and a further word z. The sequence of words x and y is in turn assigned to the syntactic category B. The first speech values a(1) and following are already assigned to the initial category via a corresponding tree. The speech values a(h) to a(k) have matched the word w best. The following speech values a(k+1) to a(i−1) were in turn the most similar to the word x. Analogously, the speech values a(i) and following were most similar to the word y, etc... After the comparison of both words x and y is completed, the process described verifies the syntactic category B, and hence the elements w and B forming the first sub-sequence are verified for the syntactic category A. As soon as the hypothesis for the word z is also completed, category A is completely verified, and a hypothesis is built up after the following category, not shown in more detail in FIG. 4. In this manner, in the process described, only hypotheses ever arise which are guaranteed to be grammatically correct from the beginning up to the current value, and this applies until the end of the speech signal, that is to say until the last speech value.

FIG. 5 illustrates schematically the block circuit diagram of a device for carrying out the process described. The acoustic speech signal is captured via the microphone 62 and converted into an electrical signal, and this is digitized in the device 64, and speech values are formed therefrom, which may be, for example, short-time spectra of the speech signal, LPC coefficients or even phonemes. These speech values are supplied one after the other as multibit data words via the connection 65 to the comparator 66.

The latter receives via the connection 67 reference data words from a memory 68 which contains for each word of a given vocabulary a sequence of reference data which has been formed analogously to the data words on the connection 65 in an earlier learning phase. The individual words in the reference data memory 68 are addressed either via the connection 85 from the memory 76 or via the connection 85b from an auxiliary memory 80, which will both be explained later. The individual reference data within the word are addressed via the connection 63 from the comparator 66 or from a controller 72, depending on in which manner known per se the comparison is carried out in detail.

The comparison results formed by the comparator 66 are supplied to the controller 72 and processed there. This controller 72, which may be a microprocessor, for example, addresses via the connection 75 a first memory 70 containing the specifications of the first list on the syntactic categories and their assignment to each other and to words or word classes, and supplies these via the connection 73 to the controller 72. This forms, in accordance with the process described, data for the third list, for which a third memory 78 is provided, which is addressed from the controller 72 via the connection 77 and which receives the data to be recorded via the connection 79. Analogously, the data read out from the third list are also supplied from the memory 78 via the connection 79 to the controller 72, so that the connection 79 is expediently of bidirectional nature.

The entries formed from the third list, in accordance with the process described, for the second list are supplied by the controller 72 to the memory 76, which is addressed via the connection 81, via the connection 83. When entering, the next free location in the second list, which may have become free due to the deletion of a word, is then addressed, and for the processing of a new speech value, supplied via the connection 65 to the comparator 66, all entries of the second list are addressed one after the other in memory 76. Provided that the second list contains in each entry a direct reference to in each case one word, this part of the entry is supplied via the connection 85 to the reference data memory 68 as an address. If the second list, however, contains in the entries references to word classes instead of individual words, which is more expedient in the case of an extensive vocabulary, this reference in question is supplied via the connection 85a to the address input of an auxiliary memory 80 which contains at each address location the addresses of the reference data memory 68 for the individual words belonging to the word class, and these addresses are supplied one after the other via the connection 85b to the reference data memory. Depending on the course of the comparison of the previous sequence of speech values with reference data, in each case the currently required reference data within the respective word are addressed via the connection 63.

As soon as the end of the sequence of reference data has been reached for a word, this is reported to the controller 72 via the connection 69. This then extends the third list in memory 78 and, if appropriate, forms new entries for further words or word classes to be compared in the second list in memory 76, as set out in the process described above and subsequently the next speech value on the connection 65 is again processed.

When the last speech value of the speech signal has been input, which may be determined, for example, by the recognition of a fairly long pause in speaking, the word sequence with the best evaluation value is read out from the third list in memory 68 and supplied via the connection 71 to an output device 74, which may be a display device or a printer or even a memory, for example.

What is claimed is:

1. A process for the recognition of speech signal derived from a continuous flow of spoken words, which speech signal comprises a temporal sequence of speech values, each of which values specifies a section of the speech signal; comprising:

comparing the speech values with predetermined stored reference values, a group of which reference values represents one word of a predetermined vocabulary for forming an initial evaluation value;

summing the comparison results over various sequences of combinations of reference values and speech values per sequence whose order is permissible in accordance with a predetermined stored first list containing, for predetermined syntactic categories, at least one assignment per category to a combination of further syntactic categories and/or words for forming a cumulative evaluation value;

generating a second list and a third list the second list including references to the reference values of all those words which are compared with the respective next speech value as well as a sequence number per word, and the third list including, for each speech value which has been compared with the last reference value of at least one word, a plurality of entries, each entry including a current sequence number and:

(a) a reference to a syntactic category of the first list, (b) a first specification for a sequence of compared words and/or syntactic categories which are assigned to sequences of already compared speech values, (c) a second specification for a sequence of words and/or syntactic categories which can be assigned to subsequent speech values on the basis of the first list, (d) a further sequence number assigned to the respective entry, (e) a first cumulative evaluation value, (f) a second initial evaluation value and (g) a sequence of compared words;

determining a new sequence number at least after every comparison of a new speech value with the last reference value of at least one word, and after each such comparison, searching through the group of entries of the third list associated with the sequence number stored in the second list at this word for such entries in which the sequence contained in the second specification begins with the compared word, and deriving a new entry for each such entry present, for the new group of the third list associated with the new sequence number;

making a first further entry in the new group for each new entry in which the abbreviated sequence contained in the second specification begins with a syntactic category, for which at least one assignment is present in the first list, and, deriving a second further entry for the new group for each of the new and first further entries of the new group for which the second specification contains an empty sequence;

repeating the steps of deriving and making the first and second further entries alternately until, after at least one first further entry, no second further entry occurs;

entering a reference to the reference data of the first word of each entry of the new group in which the second sequence begins with a word to be recognized;

comparing the next speech value with the reference values of all words contained in the second list;

repeating the process steps until the last speech value of the speech signal to be recognized has been processed; checking the last group of the third list for all entries containing: a reference to the syntactic initial category, an empty sequence, and a sequence number; and reading out the sequence of compared words from those entries having the smallest first evaluation value.

2. A process according to claim 1, wherein:

before the comparison of the first speech value, the first group contains:

a plurality of first entries each entry including: a reference to a syntactic initial category, an empty sequence as a first specification, another of the combinations assigned to the initial category as a second specification, and an initial value for the two evaluation values; and further entries including all the catagories which can be derived from each of the combinations of the second specification with a corresponding combination; and wherein each new entry in the first specification contains a sequence extended to include the compared word, a sequence abbreviated to exclude the compared word in the second specification, the evaluation value incremented by the sum of the comparison results of the word as a first evaluation value, the sequence extended to include the compared word as a sequence of compared words, and the values of the entry present;

wherein each of the first further entries includes a reference to the syntactic category of the new entry, from which this first further entry is derived, an empty sequence in the first specification, another combination assigned to the syntactic category as a sequence in the second specification, the new sequence number as a further sequence number, the evaluation value of the new entry for both evaluation values, and an empty sequence as a sequence of compared words;

reading out the earlier entry for each second further entry, from that group specified in the further sequence number of the relevant new or further first entry, where the sequence associated with the second specification begins with the new syntactic category to which this new or first further entry of the new group contains a reference, wherein the second entry contains: the reference to the syntactic category of the earlier entry, a sequence extended to include the syntactic category of the current new or first further entry in the first specification, a sequence abbreviated to exclude the same syntactic category in the second specification, the sequence number of the earlier entry as a further sequence number, the sum of the first evaluation value of the earlier entry and the difference between the two evaluation values of the current entry as a first evaluation value, the corresponding evaluation value of the earlier entry and the sequence of compared words of the earlier entry extended to include the sequence of compared words of the entry of the current group as a second evaluation value; and entering into the second list each reference to the reference data, the associated first evaluation value, and the sequence number of the relevant entry.

3. A process according to claim 2 comprising making each first and second further entry only if no entry is present in the new group, which entry contains the same reference, the same first and second specification and the same further sequence number and in which the first evaluation value is smaller than the first evaluation value of the intended further entry; and if such an entry is already present but with a greater evaluation value, deleting such entry.

4. A process according to claim 2 comprising entering a reference to reference data into the second list only if no reference to the reference data of the same word and the same sequence number with a smaller evaluation value is already present in said list; and if such entry is already present but with a greater evaluation value, deleting such entry.

5. A process according to claim 2, comprising making each new and each first and second further entry only if its first evaluation value is smaller than a threshold value which is equal to the smallest first evaluation value, extended by a constant, of all entries currently contained in the second list.

6. A process according to claim 5, comprising deleting every entry in the second list whose first evaluation value is greater than the threshold value.

7. A process according to claim 6, comprising determining from the evaluation value of the preceding speech value, the threshold value as a smallest first evaluation value of the entries of the second list.

8. A process according to claim 2, comprising deleting a word from the second list if the number of sequence numbers lying between the new sequence number and the sequence number stored at the word is greater than a limit value contained in the reference values for this word.

9. A process according to claim 1, comprising assigning predetermined syntactic categories to other syntactic categories and/or word classes in said first list; and entering a reference to a word class in said second list for all entries of the new group where the second sequence begins with a word class.

10. A process according to claim 9, comprising calling up an auxiliary list with each reference in the second list, an auxiliary list is called up containing for each word class the reference to the reference data of the words belonging to this class, and these references call up the corresponding reference values from the further list.

11. Apparatus for carrying out the process according to claim 1, comprising input means for receiving a spoken sentence in the form of an electrical speech signal;
conversion means connected to said input means for forming speech values; a first memory containing specifications on syntactic categories of natural language and their assignment to further syntactic categories and/or specifications for words or word classes;
a further memory for reference values formed analogously to the speech values from sentences spoken earlier;
comparison means connected to an output of the conversion means and to a data output of the further memory for supplying comparison results from the comparison of speech values with reference values;
a second memory for storing the entries for the second list specifying at least a part of the address of the further memory; and
a third memory for storing the entries for the third list;
controller means for addressing the first, the second and the third memory and for recording data in the second and the third memory and reading out of the first, second and third memory and on receiving a word end signal for at least one word, forming the new first and second further entries for the third memory and subsequently the entries for the second memory and recording in these; and, output means for outputting after processing the last speech signal the complete word string contained in the third memory with the smallest evaluation thereof.

12. Apparatus according to claim 11, wherein the controller comprises a programmed microprocessor.

13. Apparatus according to claim 11, comprising an auxiliary memory having an address input coupled to an output of the second memory and an output coupled to a partial address input of the further memory.

* * * * *